(12) United States Patent
Pope et al.

(10) Patent No.: US 9,623,324 B2
(45) Date of Patent: *Apr. 18, 2017

(54) PHYSIOLOGICALLY MODULATING VIDEOGAMES OR SIMULATIONS WHICH USE MOTION-SENSING INPUT DEVICES

(71) Applicant: The United States of America as represented by the Administrator of the National Aeronautics and Space Administration, Washington, DC (US)

(72) Inventors: Alan T. Pope, Poquoson, VA (US); Chad L. Stephens, Poquoson, VA (US); Nina Marie Blanson, Yorktown, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 396 days.

This patent is subject to a terminal disclaimer.

(21) Appl. No.: 14/212,159

(22) Filed: Mar. 14, 2014

(65) Prior Publication Data

US 2014/0256431 A1 Sep. 11, 2014

Related U.S. Application Data

(63) Continuation-in-part of application No. 13/166,166, filed on Jun. 22, 2011, now Pat. No. 8,827,717.

(60) Provisional application No. 61/361,084, filed on Jul. 2, 2010, provisional application No. 61/499,733, filed on Jun. 22, 2011, provisional application No. 61/781,355, filed on Mar. 14, 2013.

(51) Int. Cl.
*A63B 69/00* (2006.01)
*A63F 13/211* (2014.01)
*A63F 13/213* (2014.01)
*A63F 13/42* (2014.01)
*A63F 13/212* (2014.01)

(52) U.S. Cl.
CPC .......... *A63F 13/211* (2014.09); *A63F 13/212* (2014.09); *A63F 13/213* (2014.09); *A63F 13/42* (2014.09)

(58) Field of Classification Search
CPC ..... A63F 2300/1012; A63B 2024/0012; A63B 2220/806; A63B 69/3608; G09B 19/0038; G09B 19/00
USPC ......................................... 434/236, 247–261
See application file for complete search history.

(56) References Cited

U.S. PATENT DOCUMENTS 6,450,820 B1 * 9/2002 Palsson .................. G09B 19/22
434/236
2011/0009193 A1 * 1/2011 Bond ...................... A63F 13/06
463/36

* cited by examiner

*Primary Examiner* — Andrew Iwamaye
*Assistant Examiner* — Jerry-Daryl Fletcher
(74) *Attorney, Agent, or Firm* — Andrea Z. Warmbier; Jennifer L. Riley; Jonathan B. Soike

(57) ABSTRACT

New types of controllers allow a player to make inputs to a video game or simulation by moving the entire controller itself or by gesturing or by moving the player's body in whole or in part. This capability is typically accomplished using a wireless input device having accelerometers, gyroscopes, and a camera. The present invention exploits these wireless motion-sensing technologies to modulate the player's movement inputs to the videogame based upon physiological signals. Such biofeedback-modulated video games train valuable mental skills beyond eye-hand coordination. These psychophysiological training technologies enhance personal improvement, not just the diversion, of the user.

18 Claims, 13 Drawing Sheets

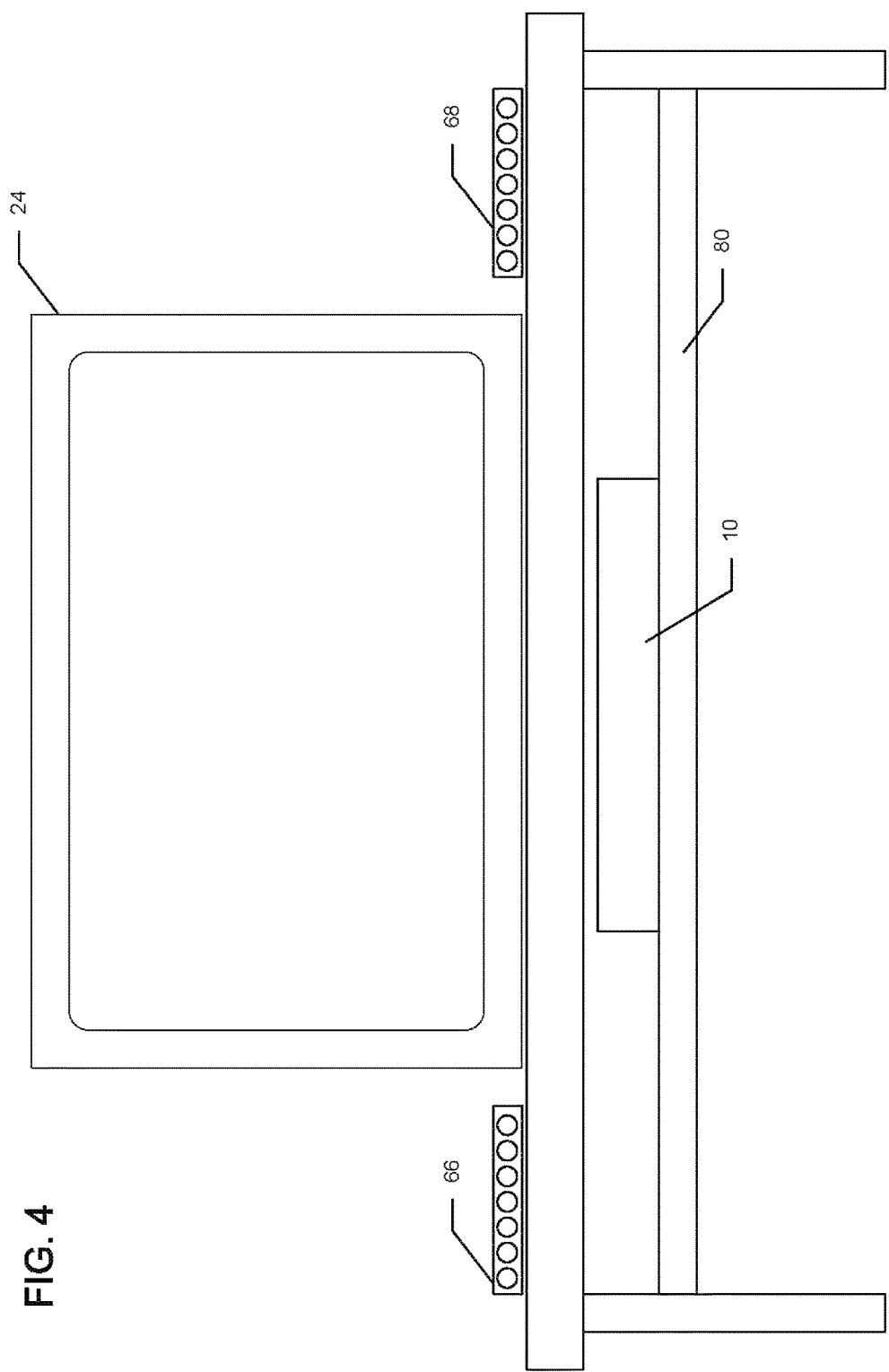

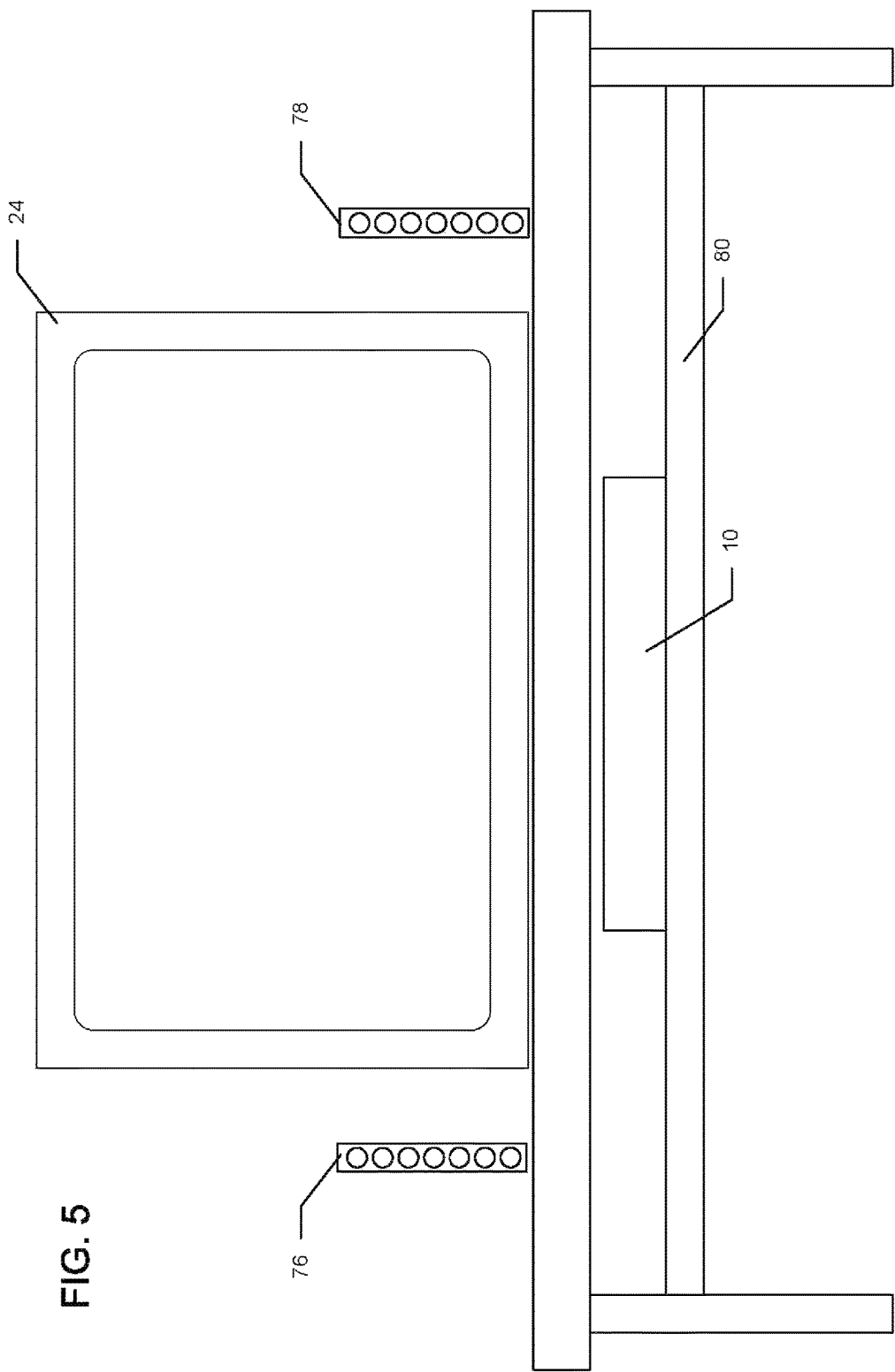

PHYSIOLOGICALLY MODULATING VIDEOGAMES OR SIMULATIONS WHICH USE MOTION-SENSING INPUT DEVICES

CROSS-REFERENCE TO RELATED APPLICATION(S)

This patent application is a continuation-in-part of, and claims the benefit of and priority to, co-pending U.S. application Ser. No. 13/166,166 entitled PHYSIOLOGICALLY MODULATING VIDEOGAMES OR SIMULATIONS WHICH USE MOTION-SENSING INPUT DEVICES filed Jun. 22, 2011, which claims the benefit of and priority to each of U.S. Provisional Patent Application No. 61/361,084, filed Jul. 2, 2010, and U.S. Application Ser. No. 61/499,733, entitled METHOD AND SYSTEM FOR PHYSIOLOGICALLY MODULATING VIDEOGAMES WHICH USE HAND AND BODY MOTION-SENSING INPUT DEVICES filed Jun. 22, 2011, the entire contents of each of the foregoing applications is incorporated herein by reference in its entirety. This patent application additionally claims the benefit of and priority to U.S. Application Ser. No. 61/781,355, entitled METHOD AND SYSTEM FOR PHYSIOLOGICALLY MODULATING VIDEOGAMES WHICH USE HAND AND BODY MOTION-SENSING INPUT DEVICES filed Mar. 14, 2013, the entire contents of which is incorporated herein by reference in its entirety. This application is also related to commonly owned, co-pending U.S. application Ser. No. 13/166,226 entitled TEAM ELECTRONIC GAMEPLAY COMBINING DIFFERENT MEANS OF CONTROL, the entire contents of which is incorporated herein by reference in its entirety.

STATEMENT REGARDING FEDERALLY SPONSORED RESEARCH AND DEVELOPMENT

The invention described herein was made by employees of the United States Government and may be manufactured and used by or for the Government of the United States of America for governmental purposes without the payment of any royalties thereon or therefore.

FIELD OF THE INVENTION

The present invention relates generally to the use of biofeedback to modify a subject's behavior, mental state, and/or physiological functioning. More specifically, the invention relates to apparatus and methods for modulating an operator's control input to an electronic game or simulator, via a motion and/or position-sensing input device, in response to measured physiological activity, such as autonomically-mediated and/or EEG physiological activity, wherein the player thereby learns to control the physiological and/or EEG activity.

BACKGROUND

Physiologically modulated video games add to the entertainment value of video games by adding the challenge of requiring a player to master physiological self-regulation skill as well as hand-eye coordination. Thus, controlling the physiological state, or learning to self-induce physiologic changes, is an additional skill requirement or challenge added to games. Although physiologically modulated videogames have entertainment value by making games more exciting, they also have advantages for encouraging health-enhancing physiological self-regulation skills or for therapeutic amplification of healthful physiological characteristics. Biofeedback, an effective treatment for various physiological problems, can be used to optimize physiological functioning in many ways. The benefits of biofeedback can, however, only be attained through a number of training sessions, and such gains can only be maintained over time through regular practice. Adherence to regular training, especially at home, has been a problem that has plagued the field of biofeedback and limited its utility to date. U.S. Pat. No. 6,450,820, which is incorporated herein by reference thereto, addressed this to a degree, by blending biofeedback into video games, which increases motivation. Biofeedback-modulated video games employing the technology of U.S. Pat. No. 6,450,820 are games that respond to physiological signals as well as mouse, joystick or game controller input; these games embody the concept of improving physiological functioning by rewarding specific healthy body signals with success at playing a video game. Such a biofeedback-modulated game method blends biofeedback into popular off-the-shelf video games in such a way that the games do not lose their entertainment value. This method uses physiological signals (e.g., electroencephalogram frequency band ratio) not simply to drive a biofeedback display directly, or periodically modify a task as in other systems, but to continuously modulate parameters (e.g., game character speed and mobility) of a game task in real time while the game task is being performed by other means (e.g., a game controller). Biofeedback-modulated video games represent a new generation of computer and video game environments that train valuable mental skills beyond eye-hand coordination. These psychophysiological training technologies are poised to exploit the revolution in interactive multimedia home entertainment for the personal improvement, not just the diversion, of the user. The technology of U.S. Pat. No. 6,450,820 modulates the manual inputs that a player makes to the buttons or joysticks of a video game hand controller. This modulation is based on measurements of physiological signals of the player.

However, a new type of video game (illustrated in FIG. 1) has a game controller that allows a player to make inputs to a video game by moving the entire controller itself. This capability is accomplished in operator-controlled game input devices, including the Nintendo wireless Wii remote using accelerometers, and an infrared LED tracking camera, and/or the remote's accessories (e.g., the Nintendo Nunchuk and MotionPlus devices using accelerometers and gyroscopes) (Nintendo, Wii and MotionPlus are registered trademarks of Nintendo of America Inc.)

Another new type of video game has a game controller that employs different camera image analysis methods than the Wii®. These new type video game systems, such as the Leap Motion®, Sony® Playstation® Move® and Microsoft® Kinect, use cameras that sense the player's image in whole or in part (e.g., the Leap Motion® or the Kinect®) or the image of an illuminated object on the player's control device (e.g., the Move®).

The video game system of FIG. 1 comprises a game console 10 that may either operate using infrared LED tracking (such as a Wii®) or player image tracking (such as a Leap Motion® or Kinect®) or illuminated object on the player's controller tracking (such as the Move®). In an infrared LED tracking configuration the system may include a controller or input device 12, a display 24 (such as a television), and left and right sensor bars 26, 28 (note, while the left and right sensor bars are illustrated as separate devices, in practice the left and right sensor bars are often incorporated into a single device having left and right portions). The game input device 12 comprises one or more gyroscopes 18 and one or more accelerometers 16 for sensing movement of the input device, an infrared receiver or camera 20 for detecting the infrared light emitting diodes (LEDs) of the sensor bars, a transmitter 22 (e.g., Bluetooth) for communicating with the console 10, user input devices (e.g., buttons, etc.) (not illustrated), and a processor 14 for processing the inputs to the game input device and controlling outputs from the game input device. The game system uses the known positional relationship between the left and right sensor bars to determine the game input device's approximate distance from the sensor bars and the input device's position and/or motion relative to the sensor bars. In a player image tracking configuration or illuminated object on the player's controller tracking configuration the system may not include the sensor bars 26 and 28 and IR receiver 20, and may rather include a camera or sensor 21 connected via wires or wirelessly to the game console 10. The camera 21 may enable the game console 10 to track the player's image in a player image tracking configuration and the camera 21 may enable the game console 10 to track the illumination of the controller 12 caused by the light source 15 in the controller 12 in a illuminated object on the player's controller tracking configuration.

However, the art described in U.S. Pat. No. 6,450,820 requires further advancement to work with these wireless controllers.

BRIEF SUMMARY OF THE INVENTION

New types of video game controllers allow a player to make inputs to a video game or simulation by moving the entire controller itself or by gesturing or by moving the player's body in whole or in part. This capability is typically accomplished using operator controlled input devices having accelerometers, gyroscopes, and/or cameras, such as using infrared LED tracking cameras or using cameras that sense a player's image in whole or in part or the image of an illuminated object on the player's control device. The present invention exploits these wireless motion-sensing technologies to modulate the player's movement inputs to the videogame based upon physiological signals.

In another embodiment of the invention, a method is provided for modifying the effect of an operator controlled input device on an interactive device to encourage the self-regulation of at least one physiological activity by the operator. The operator controlled input device has motion and/or position-sensing capability. The interactive device comprises a display area which depicts images, and apparatus for receiving at least one input from the operator controlled input device to thus permit the operator to control and interact with at least some of the depicted images. The method for modifying comprises the steps of measuring at least one physiological activity of the operator to obtain at least one physiological signal having a value indicative of the level of the at least one physiological activity; and modifying the motion and/or position sensing capability of the operator controlled input device in response to (a) changes in the measured at least one physiological signal and/or (b) differences between the measured at least one physiological signal and a corresponding predetermined desired physiological signal level, thereby modifying the ability of the operator to control and interact with at least some of the depicted images.

Modifying the motion and/or position sensing capability of the operator controlled input device may comprise modulating a voltage input to one or more motion and/or position-sensing elements of the input device. The one or more motion and/or position-sensing elements may comprise one or more accelerometers and/or one or more gyroscopes.

Modifying the motion and/or position sensing capability of the operator controlled input device may comprise modifying one or more position reference signal elements that are used by the input device to determine a motion or position of the operator controlled input device relative to the one or more position reference signal elements. The one or more position reference signal elements may comprise two light emitting diodes (LEDs) or two sets of LEDs having a fixed distance therebetween. The operator controlled input device may comprise a light detector for detecting light emitted from the LEDs. Modifying one or more position reference signal elements may comprise mechanically translating the two LEDs or two sets of LEDs from a first position to a second position, the difference between the first and second positions being based on either (a) the difference between the measured at least one physiological signal and the corresponding predetermined desired physiological signal level, or (b) the measured at least one physiological signal.

The one or more position reference signal elements may comprise a plurality of LEDs, two of which emit light at any particular time. The operator controlled input device may comprise a light detector for detecting light emitted from the LEDs. Modifying one or more position reference signal elements may comprise changing which two of the LEDs are emitting light at any particular time. Changing which two of the LEDs are emitting light at any particular time may comprise turning pairs of LEDs on and off in a predetermined pattern based on either (a) the difference between the measured at least one physiological signal and the corresponding predetermined desired physiological signal level, or (b) the measured at least one physiological signal.

The plurality of LEDs may comprise two groups of linearly arranged LEDs, each of the two linearly arranged groups being positioned substantially horizontally. Alternatively, the plurality of LEDs may comprise two groups of linearly arranged LEDs, each of the two linearly arranged groups being positioned substantially vertically. As another alternative, the plurality of LEDs may comprise two groups of LEDs, each of the groups being arranged in two linearly arranged sub-groups, each sub-group of a group crossing the other sub-group at a center of each sub-group and at a perpendicular angle.

Measuring at least one physiological activity may comprise measuring at least one of: autonomically-mediated physiological activity, and brainwave electrical activity. The autonomic physiological activity may comprise at least one of: skin temperature; skin conductance; electrical activity of muscles; blood flow; heart rate; heart rate variability; and respiratory rate. The brainwave electrical activity may comprise at least one of: event-related potentials; and at least one brainwave frequency band; the at least one brainwave frequency band comprising at least one of: (a) theta, (b) alpha, (c) sensorimotor response (SMR), (d) beta, and (e) gamma.

The method may further comprise displaying the at least one physiological signal having a value indicative of the level of the at least one physiological activity. Displaying the at least one physiological signal may comprise displaying and monitoring the physiological signal on a signal display system substantially separate from the interactive device. However, such a separate display can be connected wirelessly, in some instances, to the interactive device.

In addition to the method for modifying the effect of an operator controlled input device on an interactive device to encourage the self-regulation of at least one physiological activity by the operator, as described above, yet other aspects and embodiments of the present invention are directed to an apparatus for modifying the effect of an operator controlled input device on an interactive device to encourage the self-regulation of at least one physiological activity by the operator.

In an embodiment, a method for modifying the effect of an operator input on an interactive device to encourage the self-regulation of at least one physiological activity by the operator, the interactive device comprising a display area that depicts images and a camera for receiving at least one input from the operator to thus permit the operator to control and interact with at least some of the depicted images, the method for modifying comprising the steps of measuring at least one physiological activity of the operator to obtain at least one physiological signal having a value indicative of the level of the at least one physiological activity; and modifying the motion and/or position sensing capability of the camera for receiving at least one input from the operator in response to (a) changes in the measured at least one physiological signal and/or (b) differences between the measured at least one physiological signal and a corresponding predetermined desired physiological signal level, thereby modifying the ability of the operator to control and interact with at least some of the depicted images. In various embodiments, the modifying the motion and/or position sensing capability of the camera for receiving at least one input from the operator may include modifying the image of the operator or the image of an illuminated object on the operator's control device using mirrors, lenses, and/or LEDs.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 illustrates a block diagram of a video game system that can benefit from embodiments of the present invention;

FIG. 2. illustrates a block diagram of portions of a system for modifying the effect of an operator controlled input device on an interactive device to encourage the self-regulation of at least one physiological activity by the operator, in accordance with embodiments of the present invention;

FIGS. 4 and 5 illustrate potential positioning options for sensor bars of a system for modifying the effect of an operator controlled input device on an interactive device to encourage the self-regulation of at least one physiological activity by the operator, in accordance with alternative embodiments of the present invention;

Figure 8:
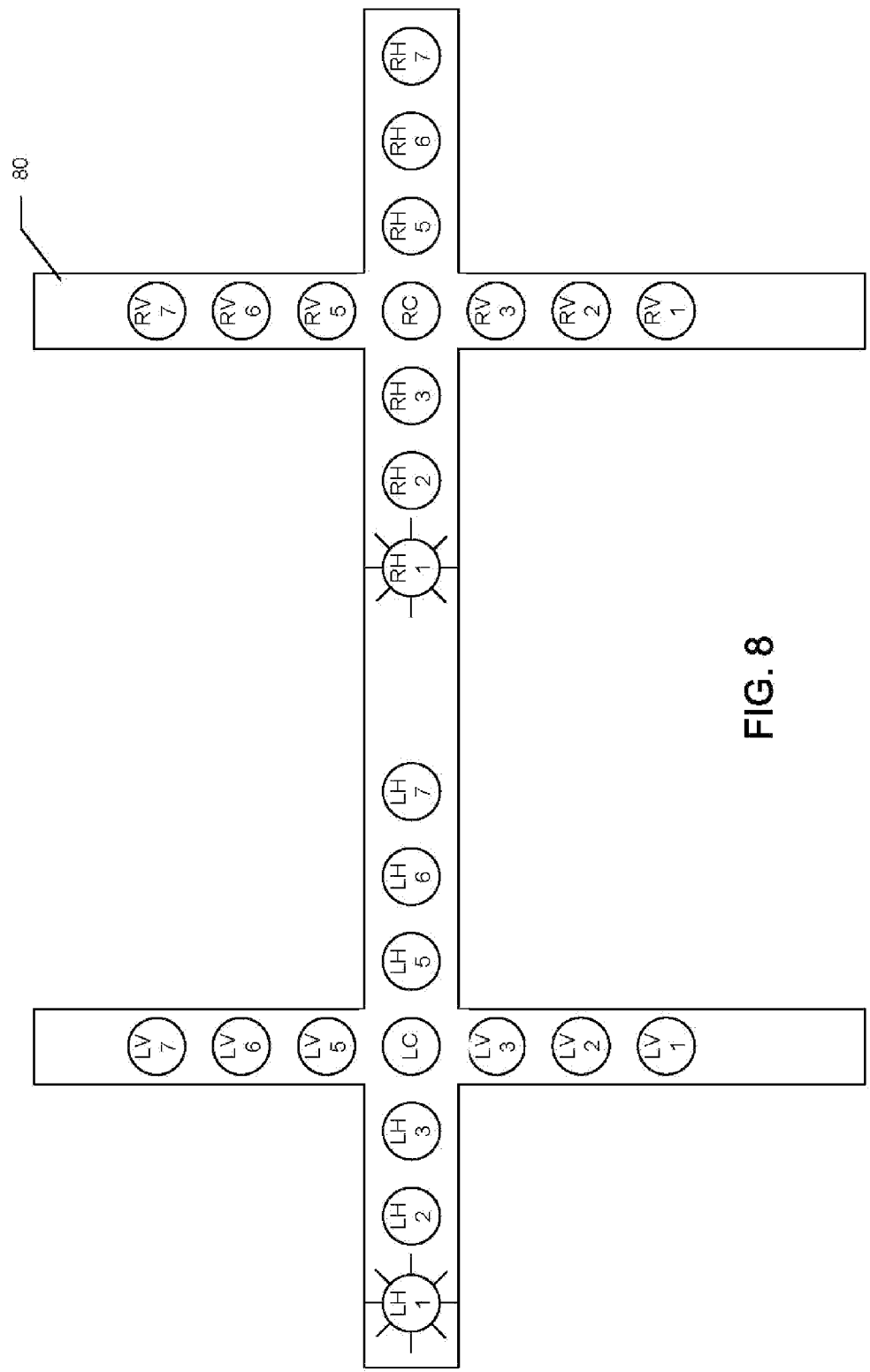
Figure 9:
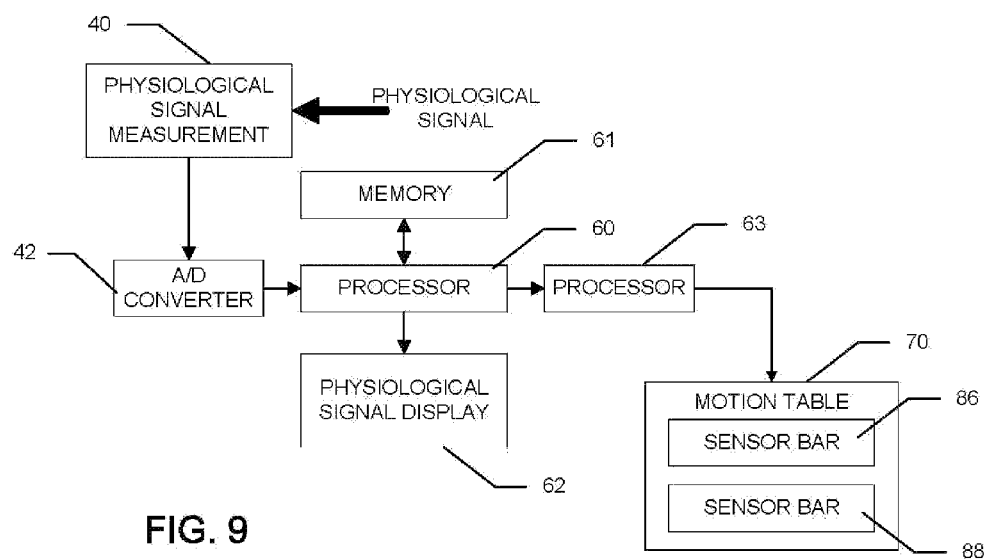
Figure 10:
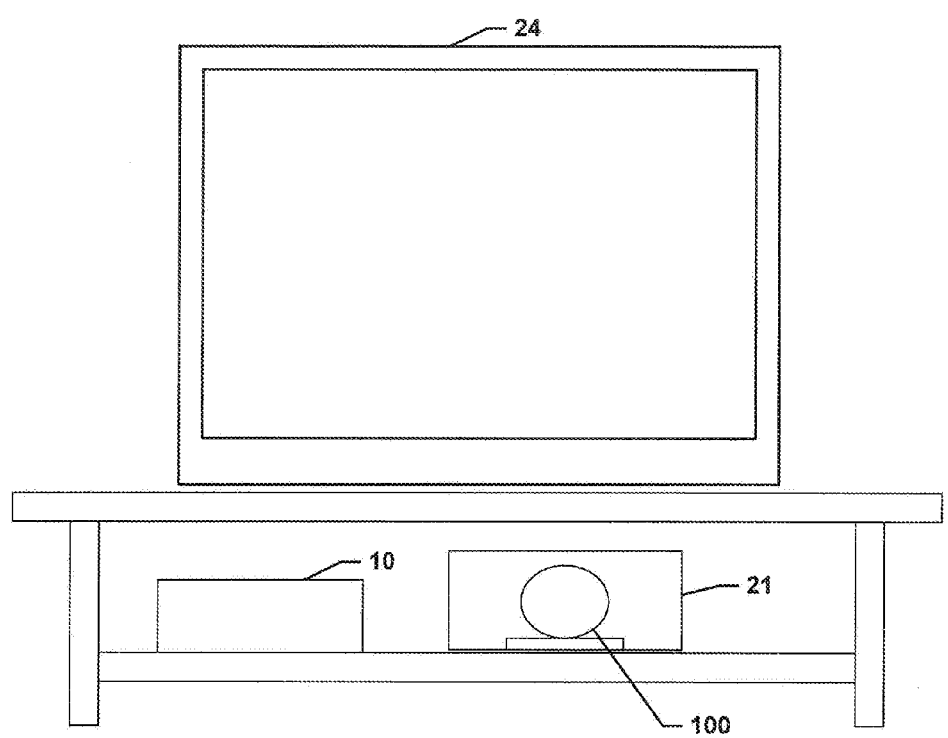
Figure 11:
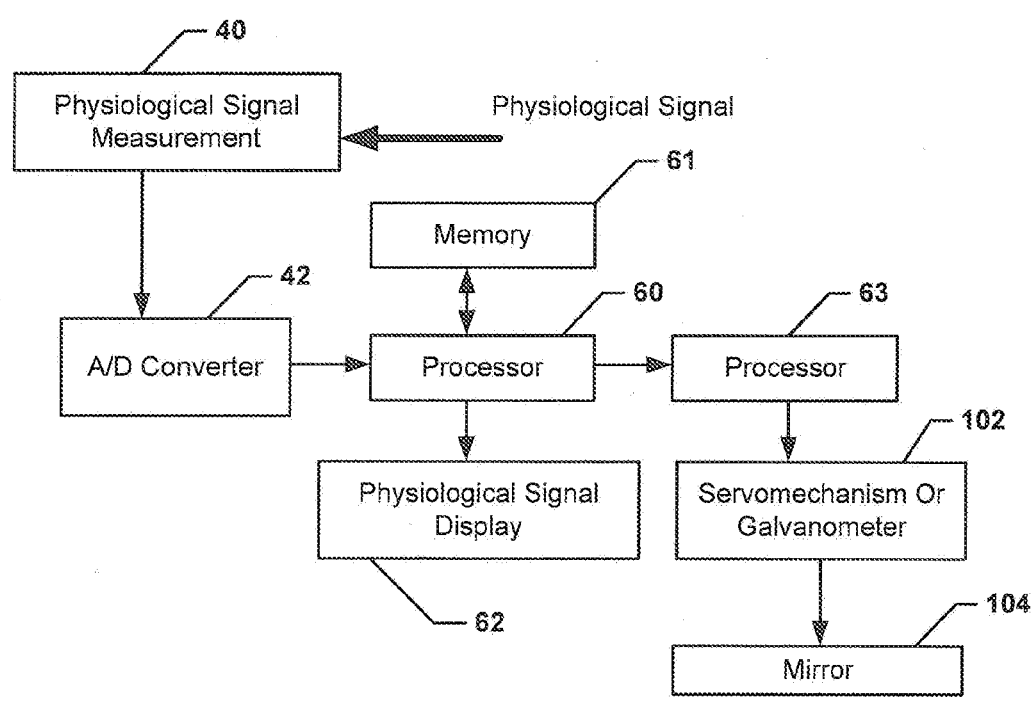
Figure 12:
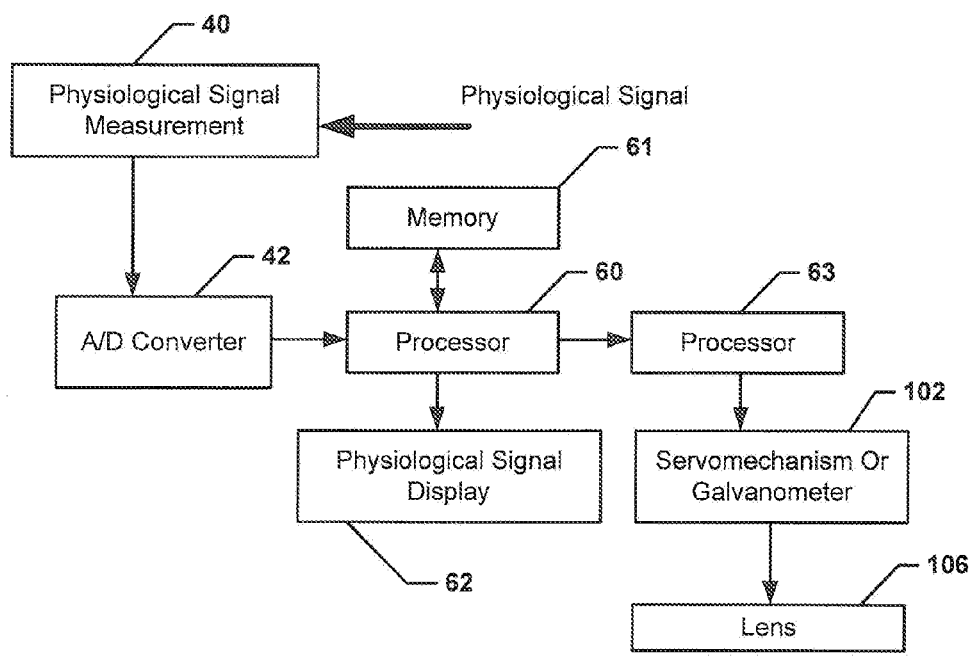
Figure 13:
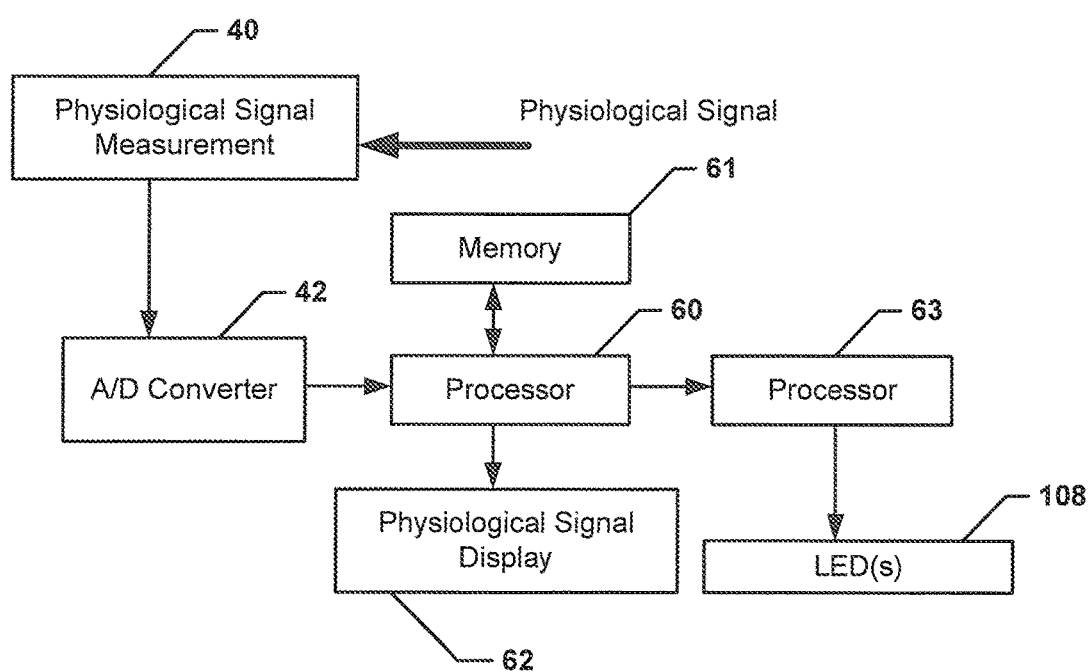
Figure 14:
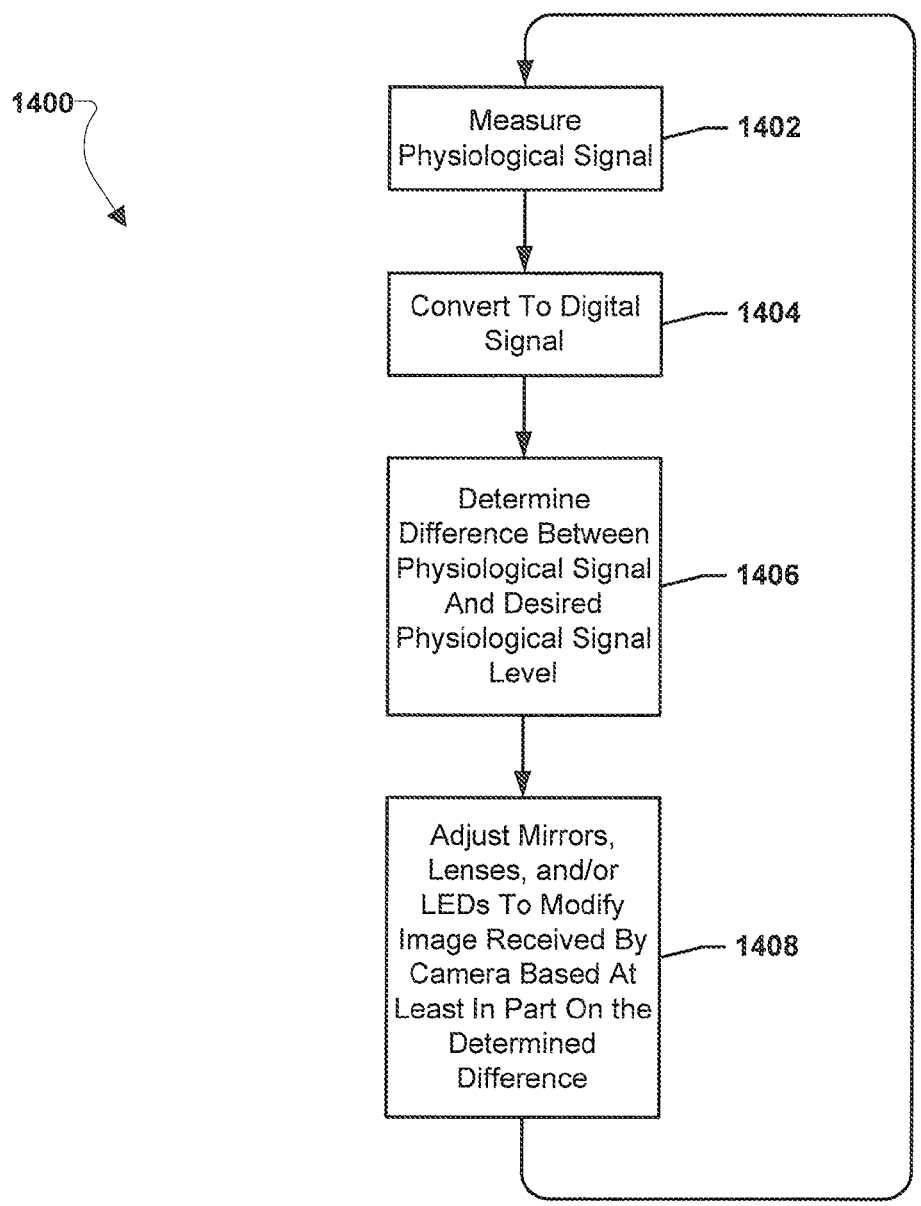

FIGS. 6A-D illustrate one possible lighting pattern for horizontal sensor bars of a system for modifying the effect of an operator controlled input device on an interactive device to encourage the self-regulation of at least one physiological activity by the operator, in accordance with embodiments of the present invention;

FIGS. 7A-D illustrate one possible lighting pattern for vertical sensor bars of a system for modifying the effect of an operator controlled input device on an interactive device to encourage the self-regulation of at least one physiological activity by the operator, in accordance with embodiments of the present invention;

FIG. 8 illustrates an alternative sensor bar of a system for modifying the effect of an operator controlled input device on an interactive device to encourage the self-regulation of at least one physiological activity by the operator, in accordance with embodiments of the present invention;

FIG. 9 illustrates a block diagram of portions of a system for modifying the effect of an operator controlled input device on an interactive device to encourage the self-regulation of at least one physiological activity by the operator, in accordance with alternative embodiments of the present invention;

FIG. 10 illustrates a potential positioning option for a device to modify the input to a camera of a game system in accordance with alternative embodiments of the present invention;

FIGS. 11-13 illustrate block diagrams of portions of systems for modifying the effect of a camera on an interactive device to encourage the self-regulation of at least one physiological activity by the operator, in accordance with alternative embodiments of the present invention; and FIG. 14 is a process flow diagram illustrating an embodiment method for modifying images received by a camera.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

New types of video game controllers allow a player to make inputs to a video game or simulation by moving the entire controller itself or by gesturing or by moving the player's body in whole or in part. This capability is typically accomplished using operator controlled input devices having accelerometers, gyroscopes, and/or cameras, such as using infrared LED tracking cameras or using cameras that sense a player's image in whole or in part or the image of an illuminated object on the player's control device. The present invention exploits these wireless motion-sensing technologies to modulate the player's movement inputs to the videogame based upon physiological signals. Examples of such new type of controllers include the Leap Motion®, Nintendo® Wii®, Sony® Playstation® Move®, and Microsoft® Kinect.

Embodiments of the invention modify the effect of an operator controlled input device having motion and/or position-sensing capability. Embodiments of the invention typically measure at least one physiological activity of the operator to obtain at least one physiological signal having a value indicative of the level of the at least one physiological activity; and modify the motion and/or position sensing capability of the operator controlled input device in response to (a) changes in the measured at least one physiological signal and/or (b) differences between the measured at least one physiological signal and a corresponding predetermined desired physiological signal level, thereby modifying the ability of the operator to control and interact with at least some of the depicted images.

In various embodiments, the player inputs to systems that use cameras that sense a player's image in whole or in part or the image of an illuminated object on the player's control device (e.g., Leap Motion®, Sony® Playstation® Move® or Microsoft® Kinect) may be similarly modulated to modify the motion and/or position sensing capability of the camera in response to (a) changes in the measured at least one physiological signal and/or (b) differences between the measured at least one physiological signal and a corresponding predetermined desired physiological signal level, thereby modifying the ability of the operator to control and interact with at least some of the depicted images.

In an embodiment physiological modulation method, the player's image in whole or in part (e.g. for the Kinect® or the Leap Motion®) or the image of an illuminated object on the player's control device (e.g., for the Move®) may be reflected into the cameras by mirrors whose positioning is dynamically driven by servomechanisms or galvanometers. This method of dynamically positioning mirrors may be similar to the method used in instruments designed to track eye movements. The amplitude of movement of the positioning servos or galvanometers in this modulation method, and, consequently, the degree of disruption, may be determined by control signals derived from the physiological difference signal. For example, a large current momentary departure of the physiological signal value from the target signal value may result in large amplitude mirror movements, and, consequently, large movement disturbances superimposed on the player's intentional movements of the image across the camera element, and, consequently, large disruptions in the stability of the player's intentional control movements. In this manner, the player is rewarded for diminishing this physiological signal difference by an improved ability to control the player controlled object (e.g., a cursor) on the screen. While discussed herein as being actuated by servomechanisms or galvanometers, servomechanisms and galvanometers are used merely as examples of actuating devices to move mirrors to better illustrate the various embodiments. Mirrors may be actuated by other devices, and servomechanisms and galvanometers as actuating devices are not intended to limit the scope of the invention.

In another embodiment physiological modulation method, the player's image in whole or in part (e.g., for the Kinect® or the Leap Motion®) or the image of an illuminated object on the player's control device (e.g., for the Move®) may be distorted and/or deflected into the cameras by lenses whose positioning is dynamically driven by servomechanisms or galvanometers. The amplitude of movement of the positioning servos or galvanometers in this modulation method, and, consequently, the degree of disruption, may be determined by control signals derived from the physiological difference signal defined previously. For example, a large current momentary departure of the physiological signal value from the target signal value may result in large amplitude lens movements and, consequently, large distortions and/or deflections superimposed on the player's intentional movements of the image on the camera element and, consequently, large disruptions in the stability of the player's intentional control movements. In this way, the player may be rewarded for diminishing the physiological signal difference by an improved ability to accurately position the player-controlled object on the screen. While discussed herein as being actuated by servomechanisms or galvanometers, servomechanisms and galvanometers are used merely as examples of actuating devices to adjust lenses to better illustrate the various embodiments. Lenses may be actuated by other devices and/or lenses themselves may adjust (e.g., open, close, etc.), and servomechanisms and galvanometers as actuating devices are not intended to limit the scope of the invention.

In another embodiment physiological modulation method for these technologies, the player's image in whole or in part (e.g., for the Kinect® or the Leap Motion®) or the image of an illuminated object on the player's control device (e.g. for the Move®) may be received by the cameras along with the images of LEDs of various colors (e.g., red, blue, green, or infrared) positioned in the periphery surrounding the camera lens or elsewhere in the visual field of the camera, whose relative brightness may be dynamically varied. The differential brightness of the LEDs in this modulation method, and, consequently, the degree of modification of the received image, may be determined by control signals derived from the physiological difference signal defined previously. For example, a large current momentary departure of the physiological signal value from the target signal value may result in a pattern of illuminated LEDs that causes large distortions superimposed on the player's intentional movements of the image on the camera element, and, consequently, large disruptions in the stability of the player's intentional control movements. In this way, the player may be rewarded for diminishing the physiological signal difference by an improved ability to accurately position the player-controlled object on the screen. The discussions of LEDs for distorting or deflecting images of a camera herein are used merely as examples of illumination devices to better illustrate the various embodiments. Other illumination devices may substituted for LEDs in the various examples, and are not intended to limit the scope of the invention.

In the various embodiments, the devices that may modify the received image of the player or the illuminated object on the player's control device may be wireless and independent of video game or simulation system itself (e.g., the Kinect® or Move® or the Leap Motion® systems) and may operate without requiring access to the video game or simulation processor or modifications to the video or game simulation system software.

Figure 1:
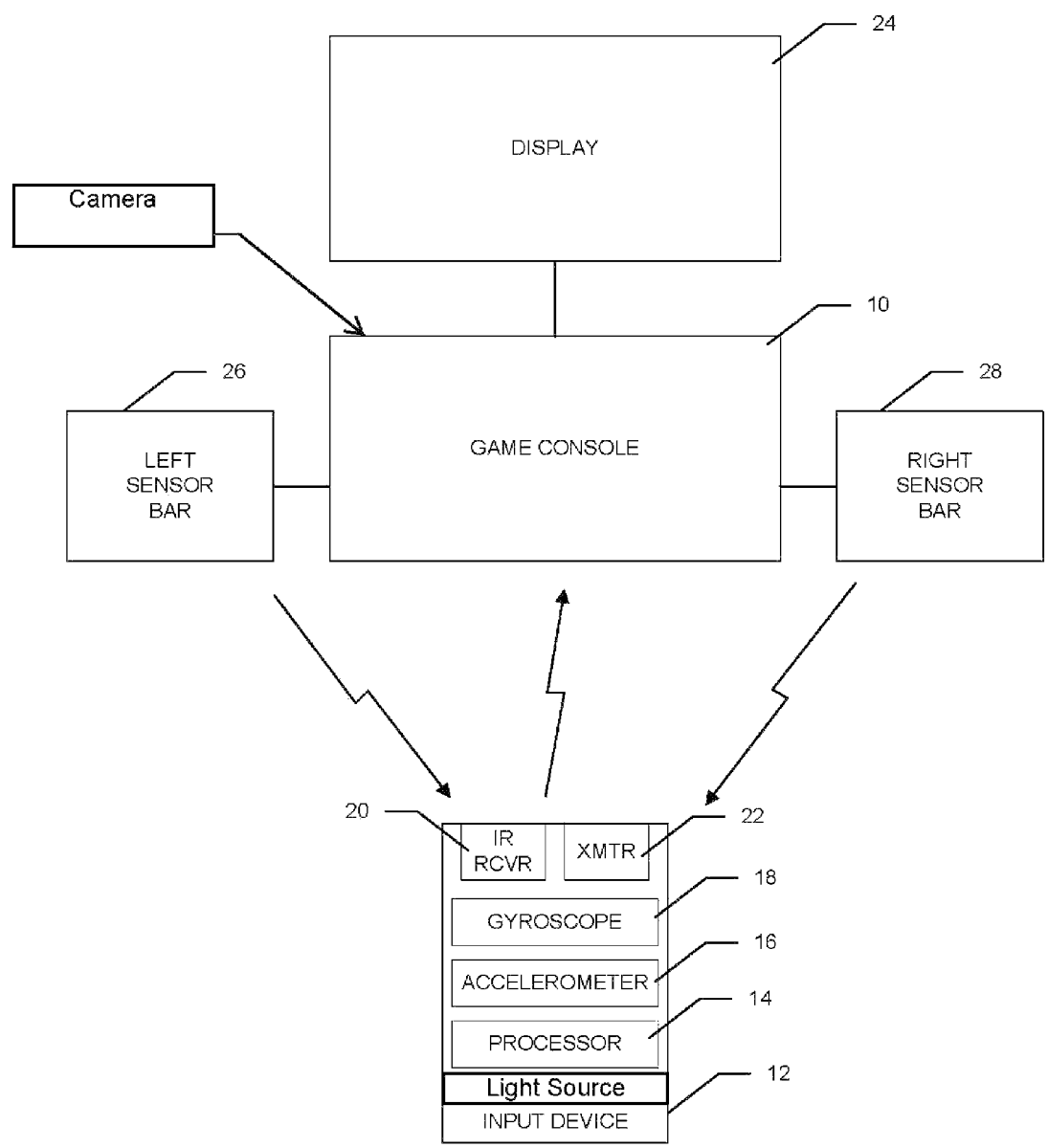
Figure 2:
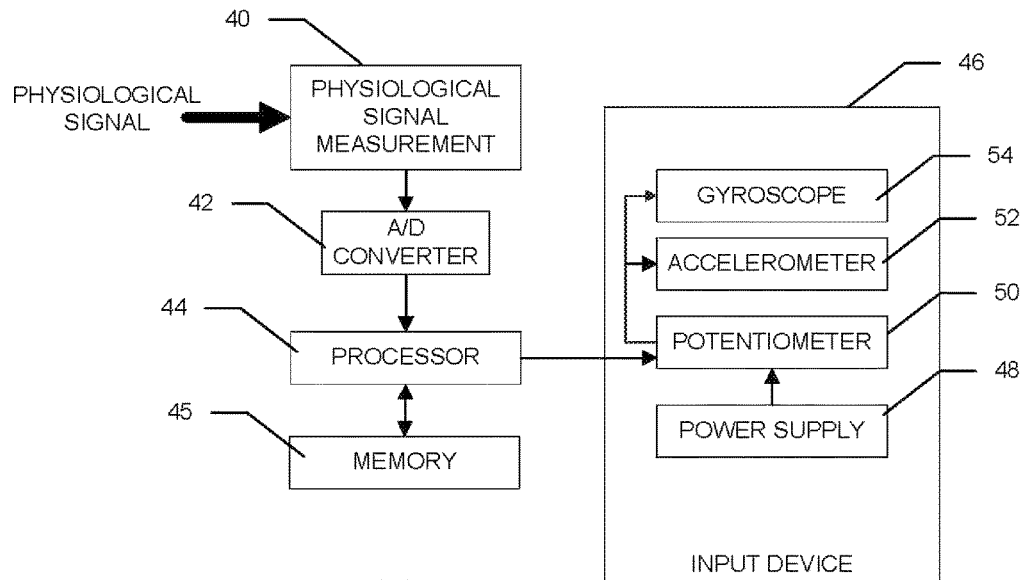

Referring now to FIG. 2, a block diagram of portions of a system for modifying the effect of an operator controlled input device on an interactive device is illustrated in accordance with embodiments of the present invention. In the embodiment of FIG. 2, the voltage input to one or more motion and/or position-sensing elements (e.g., accelerometers and/or gyroscopes) of the input device is modulated (increased or decreased). This modulation of the voltage that powers the accelerometers and/or gyroscopes in operator controlled input devices changes (increasing or reducing) the effect of the player's movement of the controller on the player-controlled object on the screen. The degree of the increase or reduction may be programmed to be proportional to the difference between the player's current momentary physiological signal value and a pre-selected target value. In this way, the player is rewarded for diminishing this difference by an improved ability to control the player-controlled object (e.g., a cursor) on the screen and/or increased power in the action of the player-controlled object on the screen (e.g., a golf club).

The system of FIG. 2 comprises a physiological signal measurement device 40 that receives physiological signal information from an operator of the system. One or more of a wide variety of different measured physiological signals can be used in accordance with the present invention, for example, electroencephalogram (EEGs), skin temperature, skin conductance, heart rate, and/or event-related potentials (ERPs). U.S. Pat. No. 5,377,100, issued on Dec. 27, 1994 to Pope et al., and which is incorporated herein by reference in its entirety, at column 3, line 8 to column 5, line 60 details a method for determining an individual's EEG index of attention, which index can be used to assess his or her mental engagement in a task. Industry-standard methods and devices for measuring these physiological signals may be used as the physiological signal measurement device 40, including but not limited to an electroencephalograph, a thermometer, a galvanic skin response device, an electromyogram, and/or an cardiotachometer. The physiological signal measurement device 40 in conjunction with the analog-to-digital converter 42 and processor 44 may (1) sample amplified and processed physiological signals (e.g., electromyogram measuring muscular tension), (2) test the signal levels with programmed conditional instructions stored in memory 45 (and possibly compare the signal levels with predetermined desired signal levels stored in memory 45), and, in accordance with the physiological signal condition determinations, (3) dynamically adjust digitally controlled potentiometers 50 that are configured as voltage dividers to modulate the voltage from power supply 48 that powers the accelerometers 52 and/or gyroscopes 54. FIG. 2 illustrates a single potentiometer that modulates the voltage to both a single accelerometer and a single gyroscope. In alternative embodiments of the invention, separate potentiometers may be used with each accelerometer and each gyroscope, and multiple accelerometers and/or multiple gyroscopes may be used in the game input device 46. In a yet further alternative embodiment, one or more accelerometers may be modulated with a single potentiometer and one or more gyroscopes may be modulated with a separate, single potentiometer. One, a plurality of, or all of the accelerometers and/or gyroscopes may be so modulated.

In an embodiment, inputs to a video game or simulation may be made by moving the entire controller itself including accelerometers, for example by moving the entire Sony® Playstation® Move® controller itself. As described above with reference to FIG. 2, a controller may include a physiological signal measurement device 40, such as an electromyogram measuring muscular tension, which may sample the physiological signals. The physiological signal measurement device 40 in conjunction with the analog-to-digital converter 42 and processor 44 may (1) sample amplified and processed physiological signals (e.g., electromyogram measuring muscular tension), (2) test the signal levels with programmed conditional instructions stored in memory 45 (and possibly compare the signal levels with predetermined desired signal levels stored in memory 45), and, in accordance with the physiological signal condition determinations, (3) dynamically adjust digitally controlled potentiometers 50 that are configured as voltage dividers to modulate the voltage from power supply 48 that powers the accelerometers 52 and/or gyroscopes 54. In this manner, unsteadiness in the controllability may be modulated by physiological signals, making game controllability a reflection of player state. For example, the effect of the accelerometers 52 on the videogame may be diminished by an amount proportional to the difference between the player's current momentary physiological signal value and a pre-selected target value, which may be accomplished by the processor 44 being programmed to adjust the potentiometer 50 to reduce the voltage that powers the accelerometers 52 to be diminished by an amount proportional to that difference. In another embodiment, the effect of the accelerometers 52 on the videogame or simulation may be perturbed by an amount proportional to the difference between the player's current momentary physiological signal value and a pre-selected target value. For example, the effect of the accelerometers 52 on the video game may be perturbed by an amount proportional to the difference between the player's current momentary physiological signal value and a pre-selected target by the processor 44 being programmed to adjust the potentiometers 50 to adjust the voltage that powers the accelerometers 52. The potentiometers 50 may be digital potentiometers configured as voltage dividers to vary, in a randomly or periodically fluctuating manner, the amplitude of the fluctuation being made proportional to the difference between the player's current momentary physiological signal value and the pre-selected target. In this manner, a change in the physiological signal in the desired direction may diminish the amplitude of the fluctuations of the supply voltage to the accelerometers 52, and the resulting effect upon the game or simulation may be to create a wavering of the controller object that may be experienced as a loss of precision controllability as the physiological signal departs from the criterion.

Figure 3:
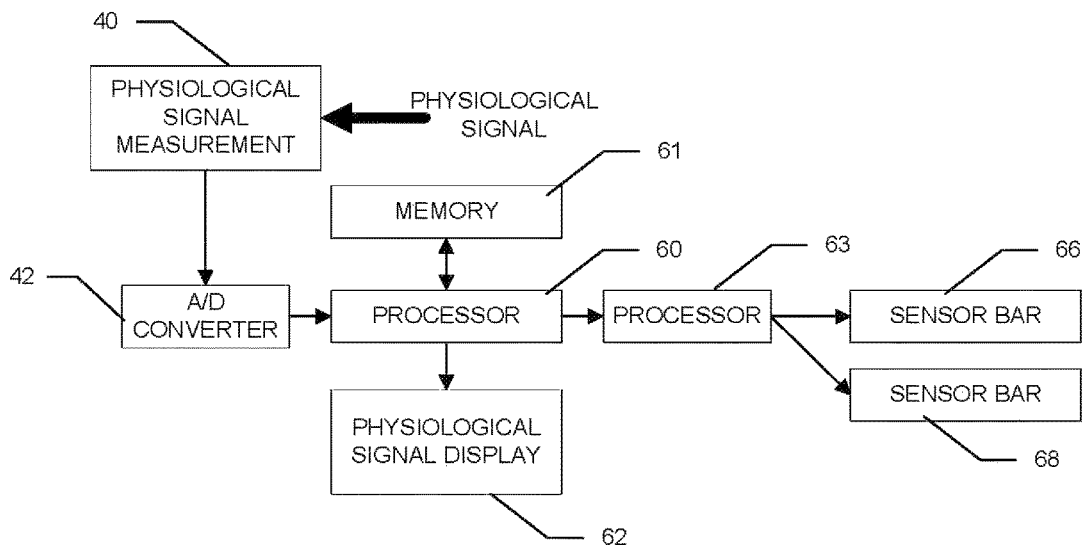
FIG. 3 illustrates a block diagram of portions of a system for modifying the effect of an operator controlled input device on an interactive device to encourage the self-regulation of at least one physiological activity by the operator, in accordance with alternative embodiments of the present invention.

Referring now to FIG. 3, a block diagram of portions of a system for modifying the effect of an operator controlled input device on an interactive device is illustrated in accordance with alternate embodiments of the present invention. In the embodiment of FIG. 3, modification is made to one or more position reference signal elements that are used by the input device to determine a motion or position of the operator controlled input device relative to the one or more position reference signal elements. These position reference signal elements are commonly referred to as "sensor bars." The one or more sensor bars each comprise a plurality of LEDs, two of which emit light at any particular time (typically one from each sensor bar). (Note, the sensor bars are described herein as separate physical devices, each having a plurality of LEDs. However, embodiments of the invention may comprise sensor bars that are combined in a single physical device, with two sets of LEDs separated by a distance.) The operator controlled input device comprises a light detector for detecting light emitted from the LEDs.

In this embodiment, the standard sensor bar of the video game system is replaced with an array of infrared LEDs that are individually controllable on and off. This embodiment of the invention turns LEDs in the array on and off in dynamic patterns to produce a disturbance in the player-directed control of the infrared-sensing videogame controller, resulting in a disruption in the stability of the player-controlled object (e.g., a cursor) on the screen. The degree of the disruption is programmed to be proportional to the difference between the player's current momentary physiological signal value and a pre-selected target value. In this way, the player is rewarded for diminishing this difference by an improved ability to accurately position the player-controlled object (e.g., a cursor) on the screen.

In the embodiment of FIG. 3, modifying one or more position reference signal elements comprises changing which two of the LEDs (typically one from each sensor bar) are emitting light at any particular time. This typically involves turning pairs of LEDs on and off in a predetermined pattern based on either (a) the difference between the measured at least one physiological signal and the corresponding predetermined desired physiological signal level, or (b) the measured at least one physiological signal.

The plurality of LEDs may comprise two groups of linearly arranged LEDs, each of the two linearly arranged groups being positioned substantially horizontally. This arrangement is illustrated in FIG. 4, which shows the two sensor bars 66, 68 spaced apart and on alternate sides of the television 24. Also illustrated is the game console 10, and all of the components are supported on a table 80. As mentioned above, the two sensor bars may be combined into a single physical device. Alternatively, the plurality of LEDs may comprise two groups of linearly arranged LEDs, each of the two linearly arranged groups being positioned substantially vertically. This arrangement is illustrated in FIG. 5, which shows the two sensor bars 76, 78 spaced apart and on alternate sides of the television 24. Also illustrated is the game console 10, and all of the components are supported on a table 80. As mentioned above, the two sensor bars may be combined into a single physical device. As another alternative, the plurality of LEDs may comprise two groups of LEDs, each of the groups being arranged in two linearly arranged sub-groups, each sub-group of a group crossing the other sub-group at a center of each sub-group and at a perpendicular angle. This embodiment is illustrated in FIG. 8 (discussed in more detail below).

The system of FIG. 3 comprises a physiological signal measurement device 40 that receives physiological signal information from an operator of the system (as described above). The physiological signal measurement device 40 in conjunction with the analog-to-digital converter 42 and processor 60 may (1) sample amplified and processed physiological signals (e.g., cardiotachometer measuring heart rate), (2) test the signal levels with programmed conditional instructions stored in memory 61 (and possibly compare the signal levels with predetermined desired signal levels stored in memory 61), and, in accordance with the physiological signal condition determinations, (3) turning on infrared LEDs in dynamic patterns to produce the described effects on the player-directed control of an infrared-sensing videogame controller.

One example implementation involves positioning one horizontal row of LEDs, e.g., 7 LEDs, in front and to the right of the player who is manipulating the input device, and another row in front and to the left of the player (as illustrated in FIG. 4). The corresponding LED in each row is simultaneously illuminated and turned on and off in synch to create a running marquee effect. This effect results in horizontally sweeping the infrared camera's two reference points used to position the cursor on the screen, producing a disruption in the stability of the player-controlled object (e.g., a cursor) on the screen. The length of the marquee run, and, consequently, the degree of the disruption, may be programmed to be proportional to the difference between the player's current momentary physiological signal value and a pre-selected target value. In this way, the player is rewarded for diminishing this difference by an improved ability to accurately position the player-controlled object (e.g., a cursor) on the screen.

More specifically, one example implementation involves processor 60 continuously sampling an integrated EMG signal, serially communicating those values to second processor 63 which reads a serial value at the initiation of each sweep of LED rows and/or columns, and controlling the timing and sweep amplitude of a marquee-like illumination of the LEDs. Another specific example implementation involves processor 60 sampling a heart rate signal (cardiotachometer), serially communicating those values to second processor 63 which reads a serial value at the initiation of each heart beat, and controlling the timing and sweep amplitude of a marquee-like illumination of the LEDs.

Figure 6A:
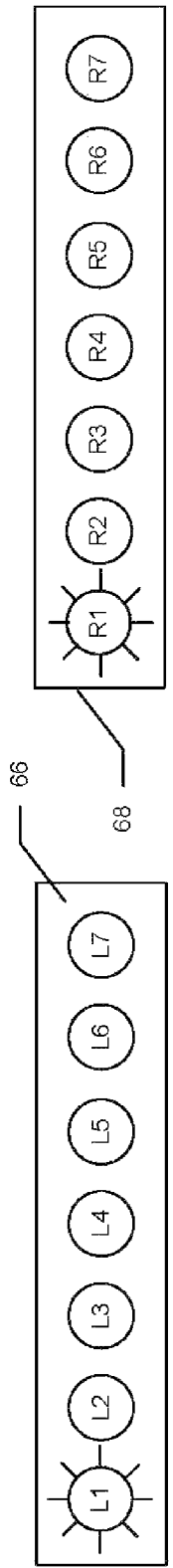
Figure 6B:
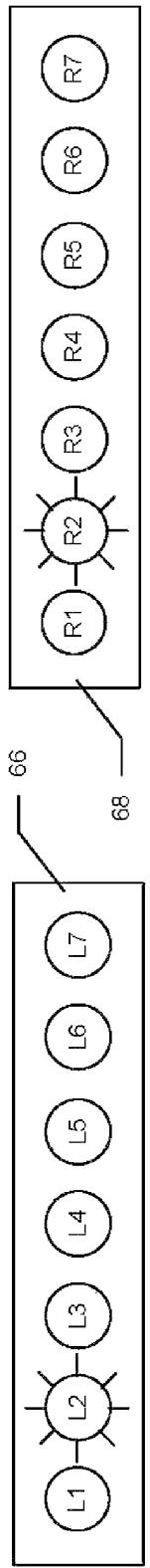
Figure 6C:
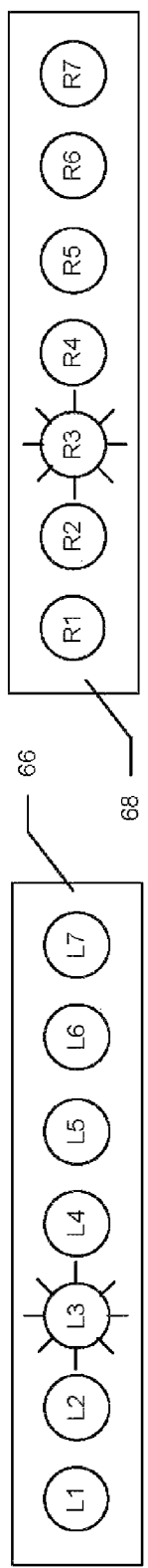
Figure 6D:
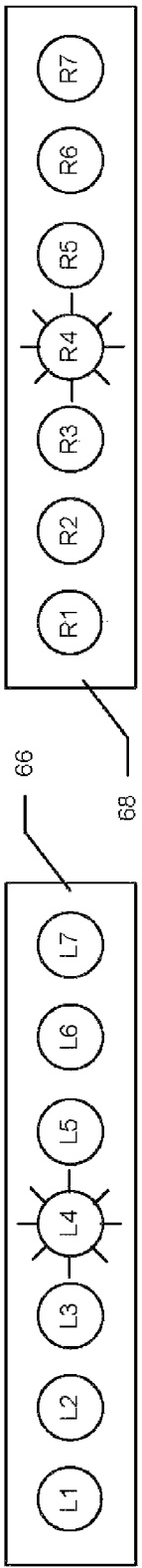

In the above two examples, the individual LEDs in each sensor bar are turned on and off in sequence (left to right or right to left) to create a marquee-like sweep. This is illustrated in FIGS. 6A-D. FIGS. 6A-D illustrate two horizontal sensor bars 66, 68, each comprising seven linearly arranged LEDs (labeled L1-L7 for the left sensor bar 66 and R1-R7 for the right sensor bar 68). First, LEDs L1 and R1 are illuminated (FIG. 6A). Then, L1 and R1 are turned off and L2 and R2 are illuminated (FIG. 6B). Then, L2 and R2 are turned off and L3 and R3 are illuminated (FIG. 6C). Finally, L3 and R3 are turned off and L4 and R4 are illuminated (FIG. 6D). This creates a left-to-right marquee sweep, which causes the input device to interpret that it is being moved erratically when in fact it is not. The speed and/or extent of the marquee-like sweep may be varied, for example in proportion to the difference between the player's current momentary physiological signal value and a pre-selected target value. The specific pattern used may vary considerably in alternative embodiments of the invention.

In another example embodiment, the infrared LEDs that the infrared camera uses to track the movement of the input device are oscillated back and forth horizontally, causing an oscillation to be superimposed on the player's movements of the input device and reflected in the movements of the player-controlled object (e.g., a cursor) on the game screen. For example, the LEDs may be illuminated in a sequence such as: L4/R4, L3/R3, L2/R2, L3/R3, L4/R4, L5/R5, L6/R6, L5/R5, and L4/R4. The amplitude and/or speed of the oscillations may be programmed to be proportional to the difference between the player's current momentary physiological signal value and a pre-selected target value. This results in an unsteadiness in the player's ability to control the player-controlled object (e.g., a cursor), which diminishes as the difference between the player's current momentary physiological signal value and a pre-selected target value diminishes.

In another example embodiment, the infrared LEDs that the infrared camera uses to track the movement of the input device are swept up and down vertically, causing an oscillation to be superimposed on the player's movements of the input device and reflected in the movements of the player-controlled object (e.g., a cursor) on the game screen. The amplitude and/or speed of the sweeps may be programmed to be proportional to the difference between the player's current momentary physiological signal value and a pre-selected target value. This results in an unsteadiness in the player's ability to control the player-controlled object (e.g., a cursor), which diminishes as the difference between the player's current momentary physiological signal value and a preselected target value diminishes. One particular implementation involves positioning one vertical column of LEDs, e.g., 7 LEDs, in front and to the right of the player who is manipulating the input device, and another row in front and to the left of the player (as illustrated in FIG. 5). The corresponding LED in each column is simultaneously illuminated and turned on and off in synch to create a running marquee effect. This effect results in vertically sweeping the infrared camera's two reference points used to position the player-controlled object (e.g., a cursor) on the screen, producing a disruption in the stability of the player-controlled object (e.g., a cursor) on the screen.

Figure 7A:
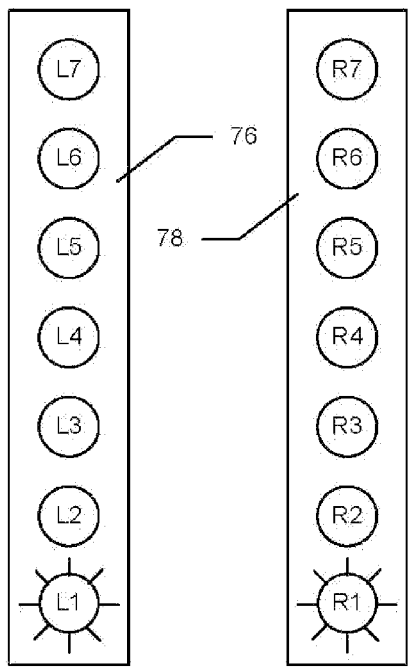
Figure 7B:
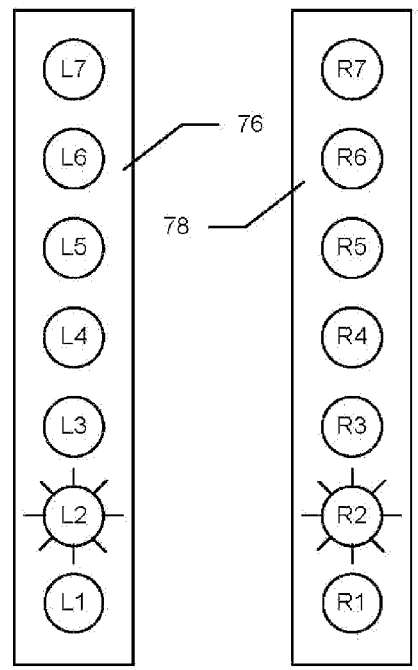
Figure 7C:
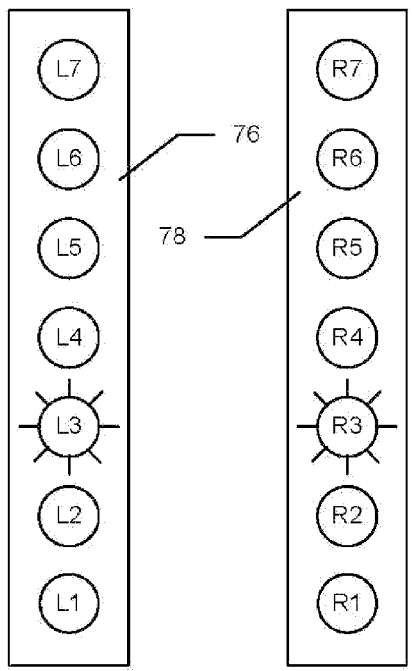
Figure 7D:
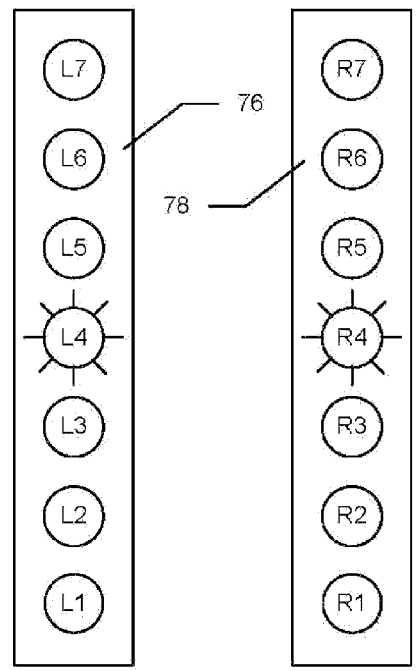

This is illustrated in FIGS. 7A-D. FIGS. 7A-D illustrate two vertical sensor bars 66, 68, each comprising seven linearly arranged LEDs (labeled L1-L7 for the left sensor bar 76 and R1-R7 for the right sensor bar 78). First, LEDs L1 and R1 are illuminated (FIG. 7A). Then, L1 and R1 are turned off and L2 and R2 are illuminated (FIG. 7B). Then, L2 and R2 are turned off and L3 and R3 are illuminated (FIG. 7C). Finally, L3 and R3 are turned off and L4 and R4 are illuminated (FIG. 7D). This creates a bottom-to-top marquee sweep, which causes the input device to interpret that it is being moved erratically when in fact it is not. The speed and/or extent of the marquee-like sweep may be varied, for example in proportion to the difference between the player's current momentary physiological signal value and a pre-selected target value. In this way, the player is rewarded for diminishing this difference by improved ability to accurately position the player-controlled object (e.g., cursor) on the screen. The sweeps may be continuous up and down oscillations whose amplitude is proportional to the player's difference signal as above. Or each sweep may be initiated on each heart beat and sweep up, or both up and down, to an amplitude proportional to the difference between the player's current momentary heart rate value and a pre-selected target value. If the goal of training is to achieve a preselected target heart rate, represented by illumination of the LEDs in the middle of each column, the LEDs in each column may be programmed to sweep up to the appropriate LED from the LED in the middle of each column, then down to the appropriate LED below the middle of each column then return to the middle LED, the amplitude of each sweep being proportional to the difference between the player's current momentary heart rate value and a pre-selected target value. For example, the LEDs may be illuminated in a sequence: L4/R4, L3/R3, L2/R2, L3/R3, L4/R4, L5/R5, L6/R6, L5/R5, and L4/R4.

The target heart rate may be determined in any of a number of ways—two examples are: (1) the target value may be input prior to game play or (2) the target value may be computed as a baseline average over N heart beats before the beginning of or during a selected period of game play. The target value could be programmed to change as the player progresses through the game. If the goal of training is simply to lower heart rate, the pre-selected target value would be, in essence, zero, and the LEDs in the column are programmed to sweep up from the bottom LED to an amplitude proportional to the player's momentary heart rate, then back down to the bottom LED. If the goal of training is to increase heart rate variability, the difference between the current momentary heart rate and the immediately preceding heart rate, or an average heart rate over N preceding heart beats, is calculated in real time and the amplitude of the vertical LED sweeps are made inversely proportional to that difference. The sweeps may correspond to the direction of the heart rate change, that is, heart rate increases produce sweeps up and decreases produce sweeps down, or the sweeps may be opposite in direction to the heart rate change, or the sweeps may be in either direction proportional to the absolute value of the heart rate change.

In an additional embodiment, illustrated in FIG. 8, the LED rows and columns are superimposed in a configuration 90 that resembles an "H", but with a crossbar comprising two collinear 7-LED horizontal rows centered on the verticals of the "H". This arrangement creates two symmetrical crosses of LEDs with horizontal and vertical radials of 3 LEDs each, emanating from center LEDs. Corresponding LEDs on the radials of each cross (i.e., a pair of LEDs) may be turned on in clockwise sequence (right horizontal, bottom vertical, left horizontal and top vertical radials for each rotation) so as to create a dynamic rotational pattern that encircles the center (LC and RC) of each cross. Such a clockwise sequence of illumination might, for example, illuminate the following pairs of LEDs in sequence: LH7/RH7, then LV1/RV1, then LH1/RH1, and then LV7/RV7.

This illumination sequence of the LEDs creates a corresponding movement pattern of the player-controlled object (e.g., a cursor) on the screen, producing a disruption in the stability of the player-controlled object (e.g., a cursor) on the screen. The radial position (i.e., how far away from the center LED) of the illuminated LEDs and, consequently, the radius of the circumscribed rotational pattern and, consequently, the degree of the disruption, may be programmed to vary in proportion to the difference between the player's current momentary physiological signal value and a pre-selected target value. In one embodiment, the radial position of the illuminated LED, determined from the previously defined physiological signal difference, is the same, i.e., the same distance from the center on the right horizontal, the bottom vertical, the left horizontal and the top vertical radials, for each rotation about the center, creating a symmetrical diamond rotational pattern. In an alternate embodiment, the radial position is determined from the physiological signal difference for each individual radial in clockwise rotation, and may vary from radial to radial, creating a swirling rotational pattern. In another alternate embodiment, the radial rotation is limited to three of the four radials, resulting in a triangular rotational pattern whose size and, consequently, the degree of the disruption, may be programmed to vary in proportion to the difference between the player's current momentary physiological signal value and a pre-selected target value. The apex of this rotating triangular pattern, the farthest vertex from the horizontal side, may be above or below the horizontal side, indicating that the momentary physiological signal value exceeds or falls below, respectively, a pre-selected target value.

In an embodiment using the sensor bar 80 of FIG. 8, these functions may be implemented with three programmable microcontrollers or processors. One processor may perform three functions: (1) controlling analog to digital converter components to sample amplified and processed physiological signals (e.g., from a cardiotachometer measuring heart rate); (2) testing the signal levels with programmed conditional instructions, and, in accordance with the physiological signal condition determinations; (3) sending a radial position value (0, 1, 2 or 3) to both of the two other processors. One of the receiving processors may control the two co-linear horizontal rows of seven LEDs each in the "H" configuration described above; the other receiving processor may control the two vertical columns of seven LEDs each. The two receiving processors engage in back and forth handshaking to turn on corresponding LEDs (i.e., a pair of LEDs) on the radials of each of the two crosses described above in clockwise sequence (right horizontal, bottom vertical, left horizontal and top vertical radials for each rotation) so as to create a dynamic rotational pattern.

In another alternative embodiment, the sensor bars (which, again, may be a single device or separate devices) may comprise two light emitting diodes (LEDs) or two sets of LEDs having a fixed distance therebetween. The LEDs may be mechanically translated from a first position to a second position. This may be accomplished by moving the sensor bars themselves, or by mechanically moving the LEDs within each sensor bar. The first alternative is illustrated in FIG. 9, in which the sensor bars 86, 88 are mounted on a motion table 70 that may be configured to move the sensor bars, in unison or separately, horizontally, vertically, or diagonally. The difference between the first and second positions may be based on either (a) the difference between the measured at least one physiological signal and the corresponding predetermined desired physiological signal level, or (b) the measured at least one physiological signal.

The measurement and analysis of the physiological signal is similar to that of the embodiment of FIG. 3. More specifically, one example implementation involves processor 60 continuously sampling a physiological signal, serially communicating those values to second processor 63 which controls the mechanical movement of the sensor bars via the motion table.

The function of the invention may be accomplished by using the physiological signals of the player, the signals of another participant who is not handling a videogame controller, or the physiological signals of one player to modulate the controller of an opposing player.

Embodiments of the invention may employ the integrated EMG signal, and the heart rate (cardiotachometer) signal. Additional embodiments may employ brainwave signals, specifically an "engagement index" derived from brainwave signals, defined in Pope, Bogart and Bartolome (Pope, A. T., Bogart, E. H., and Bartolome, D. S. (1995). Biocybernetic System Validates Index of Operator Engagement in Automated Task. *Biological Psychology*, 40, 187-195), the contents of which are incorporated herein in its entirety. Other physiological signals that may be used include, but are not limited to, skin conductance signals, skin temperature signals and respiration signals.

A noise-reducing enhancement may be desired for obtaining electrical heart signal. The heart rate signal may be derived from a photoplethysmograph sensor or electrocardiogram electrodes. One convenient method for obtaining the electrocardiogram heart signal is the use of chest band electrodes in combination with a wireless transmitter (e.g., Polar Model T31 from Polar Electro USA). Such a technology minimizes movement artifact (electrical noise) and enables the invention to be used conveniently with the active and exercise games popular on the video game systems.

In addition to the methods described above are the following methods of superimposing movements on the player's control of in-game objects (e.g., a cursor, character) on the screen, producing a disruption in the stability of the player-controlled object (e.g., a cursor, character) on the screen and/or modulation of game feedback signals that vary in proportion to either (a) the difference between the measured at least one physiological signal and the corresponding predetermined desired physiological signal level, or (b) the measured at least one physiological signal:

1. Physiological signals can be used to modulate a momentary illumination of off-center LEDs in the sensor bars resulting in a brief change (bump) in the reference position for the position/motion of the input device.

2. Physiological signals can be used to modulate the magnitude of a superimposed momentary displacement (bump) to control inputs in the input device (buttons, joysticks, accelerometers and/or gyroscopes). These displacements may be superimposed upon ongoing inputs a player provides to the game (movement in all directions, jump, accelerate). The displacements may also function as additional inputs to the game without input from the player (e.g., firing a weapon).

3. Physiological signals can be used to simultaneously modulate the magnitude of a superimposed momentary displacement (bump) of more than one control input.

4. Multiple physiological signals can be combined to modulate the magnitude of a superimposed momentary displacement (bump) of a single control input. Multiple physiological signals can be used to simultaneously modulate the magnitude of a superimposed momentary displacement (bump) of more than one control input.

5. Physiological signals can be combined with the tactile (haptic) and/or auditory signals of the input device, for example, to produce a momentary displacement (bump) in or slowing of the movement of the player's character on screen.

6. Physiological signals can be used to modulate the effect of the tactile (haptic) and auditory signals delivered to the player through the game input device and/or audio output of the game console.

In at least one advantageous and exemplary embodiment, including but not limited to the LED embodiments described above, the current invention interacts wirelessly with a Wii remote through infrared transmission, and has the unique advantage of not requiring direct connection or wiring into the Wii video game or access to the Wii system software or firmware.

In other exemplary embodiments, the challenge of various games can be enhanced by attenuation (joystick, button and/or motion-control dampening or perturbation) and/or by disruption (cursor movement modulation). Such outside controls, focus on overt acts for systems like the Wii motion-control or the Microsoft® Kinect® motion detector, while working with inside controls and covert acts through body behaviors and such like NASA's MindShift (demonstrated in 2010 using a sensor attached to the player's earlobe, checking the pulse and wired into the control or sensors attached to the forehead, seeking the facial muscle strain that is a sign of stress). Accordingly, in certain examples, psycho-physiological modulation of gameplay can be implemented in conjunction with the Wii system games, including but not limited to, first person shooter games where cross hairs position and point of view modifications are used. Alternative games can include without limitation, medical simulations using cursor position modification to teach stress management during medical procedures; sports simulations such as for instance golf swing strength, modulation and ball control; and racing games where vehicle steering attenuation is contemplated.

As discussed above, in various embodiments, the player inputs to systems that use cameras that sense a player's image in whole or in part or the image of an illuminated object on the player's control device (e.g., Leap Motion®, Sony® Playstation® Move® or Microsoft® Kinect) may be modulated to modify the motion and/or position sensing capability of the camera in response to (a) changes in the measured at least one physiological signal and/or (b) differences between the measured at least one physiological signal and a corresponding predetermined desired physiological signal level, thereby modifying the ability of the operator to control and interact with at least some of the depicted images. In an embodiment, the camera's capture of the image of the player or the image of an illuminated object of the player's controller may be modified (e.g., distorted or deflected) by a device placed adjacent to the camera, such as in front of, beside, and/or over the camera. In various embodiments, the device may include: one or more mirror positioned by one or more servomechanism or one or more galvanometer; one or more lenses positioned by one or more servomechanism or one or more galvanometer; and/or one or more LED to illuminate the camera, and the servomechanisms, galvanometers, and/or LEDs may be controlled by one or more processor in response to physiological signal condition determinations. The modification of the player's image or the image of an illuminated object on the player's control device may result in the control of the images on the display of the game system or simulation system by the player being improved or hindered based on the degree of modification caused to the image received by the camera.

FIG. 10 illustrates an arrangement of an embodiment system in which a modification device 100 is positioned in front of the camera 21 of the game console 10. In this manner the modification device 100 may distort the image of the player or the image of the illuminated object of the player's controller received by the camera. In an embodiment, the modification device 100 may utilize mirrors to distort or deflect the image of the player or the image of the illuminated object of the player's controller received by the camera. The mirror or mirrors may be positioned in front of or beside the camera and the movement of the mirror or mirrors may adjust the level of distortion of the image captured by the camera. In an embodiment, the modification device 100 may utilize lenses to distort or deflect the image of the player or the image of the illuminated object of the player's controller received by the camera. The lens or lenses may be positioned in front of or beside the camera and the movement of the lens or lenses may adjust the level of distortion of the image captured by the camera. In an embodiment, the modification device 100 may utilize LEDs to distort the image of the player or the image of the illuminated object of the player's controller received by the camera. The LEDs may be positioned in the periphery surrounding the camera lens or elsewhere in the visual field of the camera, and the relative brightness of the LEDs may be dynamically varied. The differential brightness of the LEDs may adjust the degree of modification of the received image at the camera.

In various embodiments, the distortion of the image of the player or the image of the illuminated object of the player's controller received by the camera may be implemented by a modification device 100 including programmable microcontrollers and analog to digital converter components to 1) sample amplified and processed physiological signals (e.g., electromyogram measuring muscular tension, an engagement index derived from the electroencephalogram or brainwaves, cardiotachometer measuring heart rate, etc.), then 2) test the signal levels with programmed conditional instructions, and, in accordance with the physiological signal condition determinations, 3) dynamically drive servomechanisms or galvanometers or patterns of illuminated LEDs to produce the described effects on the player-directed control of a videogame motion-sensing technology.

One implementation involves a microcontroller of the device 100 continuously sampling the integrated EMG signal, serially communicating those values to a second microcontroller of the device 100 which reads a serial value and dynamically drives servomechanisms or galvanometers or illuminates patterns of illuminated LEDs to produce the described effects on the player-directed control of a videogame motion-sensing technology. Another implementation involves a microcontroller of the device 100 sampling the heart rate signal, serially communicating those values to a second microcontroller of the device 100 which reads a serial value at the initiation of each heart beat, and dynamically drives servomechanisms or galvanometers or illuminates patterns of illuminated LEDs to produce the described effects on the player-directed control of a videogame motion-sensing technology.

In the various embodiments, the degree of the disruption may be programmed to be proportional to the difference between the player's current momentary physiological signal value and a pre-determined target value. In this way, the player may be rewarded for diminishing this difference by improved ability to accurately position the player-controlled object on the screen. In an embodiment, the driving of the servomechanisms or galvanometers or the patterning of illuminated LEDs may be continuous shifts whose amplitude may be proportional to the player's difference signal as described above. In another embodiment, each deflection, distortion, or pattern may be initiated on each heart beat and deflect, distort or pattern in first one and then another direction to an amplitude proportional to the difference between the player's current momentary heart rate value and a pre-determined target value. If the goal of training is to achieve a pre-determined target heart rate, the servos or galvanometers and thus the mirrors or lenses and/or the LEDs may be programmed to deflect, distort or pattern to the appropriate amplitude from a resting position or configuration, then to the appropriate amplitude in the opposing direction from the resting position or configuration, and then return to the resting position or configuration. The amplitude of each deflection, distortion or pattern may be proportional to the difference between the player's current momentary heart rate value and a pre-determined target value.

The target heart rate may be determined in any of a number of ways; two examples are: 1) the target value may be input prior to game play or 2) it may be computed as a baseline average over N heart beats before the beginning of, or during, a selected period of game play. If the goal of training is simply to lower heart rate, the pre-determined target value may be, in essence, zero, and the servos, galvanometers, lenses, or LEDs may be programmed to deflect, distort or pattern from a resting position or configuration to an amplitude proportional to the player's momentary heart rate, then return to a resting position or configuration. If the goal of training is to increase heart rate variability, the difference between the current momentary heart rate and the immediately preceding heart rate, or an average heart rate over N preceding heart beats, is calculated in real time and the amplitude of the deflections, distortions or patterns may be made inversely proportional to that difference. The deflections, distortions or patterns may correspond to the direction of the heart rate change, that is, heart rate increases produce deflections, distortions or patterns in an up direction and decreases produce deflections, distortions or patterns down. Additionally, the deflections, distortions or patterns may be opposite in direction to the heart rate change, or the deflections, distortions or patterns may be in either direction proportional to the absolute value of the heart rate change.

FIGS. 11-13 illustrate block diagrams of portions of embodiment devices for modifying the effect of a camera on an interactive device to encourage the self-regulation of at least one physiological activity by the operator. The operations of the devices illustrated in FIGS. 11-13 are similar to the devices described above in FIGS. 3 and 9, except that rather than adjusting sensor bars 66, 68, 86, and 88 and/or a motion table 70, the processor 63 may cause lens(es) 106, mirror(s) 104, or LED(s) 108 to be adjusted. As illustrated in FIG. 11, a mirror 104 may be connected to a servomechanism or galvanometer 102 connected to the processor 63. The processor 63 may control the servomechanism or galvanometer 102 to adjust the mirror 104 based at least in part on the difference between the physiological signal measurements and the desired physiological signal level as described above to modify the image received by the camera of the game or simulation system. As illustrated in FIG. 12, a lens 106 may be connected to a servomechanism or galvanometer 102 connected to the processor 63. The processor 63 may control the servomechanism or galvanometer 102 to adjust the lens 106 based at least in part on the difference between the physiological signal measurements and the desired physiological signal level as described above to modify the image received by the camera of the game or simulation system. As illustrated in FIG. 13, one or more LEDs 108 may be connected to the processor 63. The processor 63 may control the illumination intensity and/or illumination pattern of the LEDs 108 based at least in part on the difference between the physiological signal measurements and the desired physiological signal level as described above to modify the image received by the camera of the game or simulation system.

FIG. 14 is a process flow diagram illustrating an embodiment method 1400 for modifying images received by a camera. In an embodiment, the operations of method 1400 may be performed by the processor of a device placed adjacent to (e.g., in front of) or in the visual field of the camera of a game console or simulation system. In block 1402 the processor may measure a physiological signal. In block 1404 the processor may convert the analog measured signal to a digital signal. In block 1406 the processor may determine a difference between the measured physiological signal and a desired physiological signal level. In block 1408 the processor may adjust one or more mirrors, lenses, and/or LEDs based at least in part on the determined difference to modify (e.g., distort or deflect) the image received by the camera, thereby modifying the ability of the operator to control and interact with at least some of the depicted images of the game console or simulation system.

In addition to the methods described above are the following methods of superimposing movements on the player's control of in-game objects (e.g., a cursor, character) on the screen, producing a disruption in the stability of the player-controlled object (e.g., a cursor, character) on the screen and/or modulation of game feedback signals that vary in proportion to either (a) the difference between the measured at least one physiological signal and the corresponding predetermined desired physiological signal level, or (b) the measured at least one physiological signal, including that physiological signals can be used to modulate a momentary shift in the driving of servomechanisms or galvanometers or the patterning of illuminated LEDs resulting in a brief change (bump) in the reference position for the position/motion of the input device.

All references, including publications, patent applications, and patents, cited herein are hereby incorporated by reference to the same extent as if each reference were individually and specifically indicated to be incorporated by reference and were set forth in its entirety herein. However, if a term in the present application contradicts or conflicts with a term in the incorporated reference, the term from the present application takes precedence over the conflicting term from the incorporated reference.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. "Or" means "and/or." As used herein, the term "and/or" includes any and all combinations of one or more of the associated listed items. As also used herein, the term "combinations thereof" includes combinations having at least one of the associated listed items, wherein the combination can further include additional, like non-listed items. Further, the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

All ranges disclosed herein are inclusive of the endpoints, and the endpoints are independently combinable with each other. Each range disclosed herein constitutes a disclosure of any point or sub-range lying within the disclosed range. Accordingly, each separate value within a range is incorporated into the specification as if it were individually recited herein. Further, each separate value can serve as an endpoint and is independently combinable with any other value as an endpoint to create a sub-range within a disclosed range.

The use of any and all examples, or exemplary language (e.g., "such as") provided herein, is intended merely to better illuminate the invention and does not pose a limitation on the scope of the invention unless otherwise claimed. Reference throughout the specification to "another embodiment", "an embodiment", "exemplary embodiments", and so forth, means that a particular element (e.g., feature, structure, and/or characteristic) described in connection with the embodiment is included in at least one embodiment described herein, and can or cannot be present in other embodiments. In addition, it is to be understood that the described elements can be combined in any suitable manner in the various embodiments and are not limited to the specific combination in which they are discussed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context. Thus, it is to be understood that variations and modifications can be made on the aforementioned structure without departing from the concepts of the present invention, and further it is to be understood that such concepts are intended to be covered by the following claims unless these claims by their language expressly state otherwise.

The invention claimed is:

1. A method for modifying the effect of an operator input on an interactive device to encourage the self-regulation of at least one physiological activity by the operator, the interactive device comprising a display area that depicts images and a device for receiving at least one light input from the operator corresponding to motion and/or position to thus permit the operator to control and interact with at least some of the depicted images, the method for modifying comprising the steps of:

measuring at least one physiological activity of the operator to obtain at least one physiological signal having a value indicative of the level of the at least one physiological activity; and modifying the light input before it is received by the device to thereby modify the motion and/or position sensing capability of the device for receiving at least one light input from the operator in response to (a) changes in the measured at least one physiological signal and/or (b) differences between the measured at least one physiological signal and a corresponding predetermined desired physiological signal level, thereby modifying the ability of the operator to control and interact with at least some of the depicted images.

2. The method of claim 1, wherein the device for receiving at least one light input from the operator to thus permit the operator to control and interact with at least some of the depicted images comprises a camera.

3. The method of claim 2, wherein modifying the light input before it is received by the device to thereby modify the motion and/or position sensing capability of the camera for receiving at least one light input from the operator comprises the step of adjusting a lens to modify, at least in part, the image of the operator or an illuminated controller of the operator received by the camera.

4. The method of claim 2, wherein modifying the light input before it is received by the device to thereby modify the motion and/or position sensing capability of the camera for receiving at least one light input from the operator comprises the step of modifying illumination of an LED to modify, at least in part, the image of the operator or an illuminated controller of the operator received by the camera.

5. The method of claim 1, wherein the at least one physiological signal comprises at least one or more of: skin temperature, skin conductance, electrical activity of muscles, blood flow, heart rate, heart rate variability, and respiratory rate.

6. The method of claim 1, wherein the at least one physiological signal comprises at least one or more of: brainwave electrical event-related potentials, and at least one brainwave frequency band; wherein the at least one brainwave frequency band comprises at least one or more of: (a) theta, (b) alpha, (c) Sensorimotor Response (SMR), (d) beta, and (e) gamma.

7. The method of claim 1, further comprising:
displaying the at least one physiological signal having a value indicative of the level of the at least one physiological activity.

8. The method of claim 1, wherein the steps of measuring and modifying are performed wirelessly without any direct connection to a camera or to the interactive device.

9. A method for modifying the effect of an operator input on an interactive device to encourage the self-regulation of at least one physiological activity by the operator, the interactive device comprising a display area that depicts images and a device for receiving at least one input from the operator to thus permit the operator to control and interact with at least some of the depicted images, the method for modifying comprising the steps of:
measuring at least one physiological activity of the operator to obtain at least one physiological signal having a value indicative of the level of the at least one physiological activity;
modifying a motion and/or position sensing capability of the device for receiving at least one input from the operator in response to (a) changes in the measured at least one physiological signal and/or (b) differences between the measured at least one physiological signal and a corresponding predetermined desired physiological signal level, thereby modifying the ability of the operator to control and interact with at least some of the depicted images, wherein the device for receiving at least one input from the operator to thus permit the operator to control and interact with at least some of the depicted images comprises a camera; and
modifying the motion and/or position sensing capability of the camera for receiving at least one input from the operator comprises the step of modifying a mirror position to modify, at least in part, the image of the operator or an illuminated controller of the operator received by the camera.

10. An apparatus for modifying the effect of an operator input on an interactive device to encourage the self-regulation of at least one physiological activity by the operator, the interactive device comprising a display area that depicts images and a device for receiving at least one light input from the operator to thus permit the operator to control and interact with at least some of the depicted images, the apparatus comprising:
at least one measurement device for measuring at least one physiological activity of the operator to obtain at least one physiological signal having a value indicative of the level of the at least one physiological activity; and
at least one modifying device for modifying the light input before it is received by the device to thereby modify the motion and/or position sensing capability of the device for receiving at least one light input from the operator in response to (a) changes in the measured at least one physiological signal and/or (b) differences between the measured at least one physiological signal and a corresponding predetermined desired physiological signal level, thereby modifying the ability of the operator to control and interact with at least some of the depicted images.

11. The apparatus of claim 10, wherein the device for receiving at least one light input from the operator to thus permit the operator to control and interact with at least some of the depicted images comprises a camera.

12. The apparatus of claim 11, wherein the at least one modifying device for modifying the light input before it is received by the device to thereby modify the motion and/or position sensing capability of the camera for receiving at least one light input from the operator comprises a mirror positioned to modify, at least in part, the image of the operator or an illuminated controller of the operator received by the camera.

13. The apparatus of claim 11, wherein the at least one modifying device for modifying the light input before it is received by the device to thereby modify the motion and/or position sensing capability of the camera for receiving at least one light input from the operator comprises a lens to modify, at least in part, the image of the operator or an illuminated controller of the operator received by the camera.

14. The apparatus of claim 11, wherein the at least one modifying device for modifying the light input before it is received by the device to thereby modify the motion and/or position sensing capability of the camera for receiving at least one light input from the operator comprises an LED to modify, at least in part, the image of the operator or an illuminated controller of the operator received by the camera.

15. The apparatus of claim 10, wherein the at least one physiological signal comprises at least one or more of: skin temperature, skin conductance, electrical activity of muscles, blood flow, heart rate, heart rate variability, and respiratory rate.

16. The apparatus of claim 10, wherein the at least one physiological signal comprises at least one or more of brainwave electrical event-related potentials, and at least one brainwave frequency band; wherein the at least one brainwave frequency band comprises at least one or more of: (a) theta, (b) alpha, (c) Sensorimotor Response (SMR), (d) beta, and (e) gamma.

17. The apparatus of claim 10, further comprising:
wherein the display area is configured to display the at least one physiological signal having a value indicative of the level of the at least one physiological activity.

18. The apparatus of claim 10, wherein the apparatus is configured to wirelessly perform the steps of measuring and modifying without any direct connection to a camera or to the interactive device.

\* \* \* \* \*